Oct. 15, 1963  G. E. MALLINCKRODT  3,107,211
NUCLEAR APPARATUS
Filed Jan. 25, 1960  3 Sheets-Sheet 1
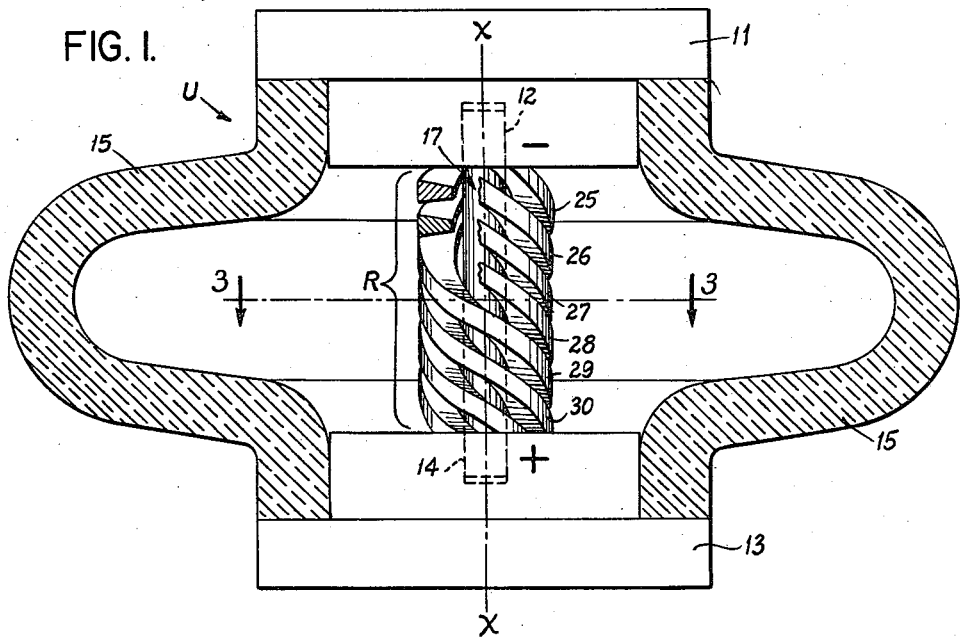
FIG. I.
FIG. 2.
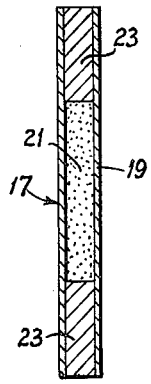
FIG. 5.
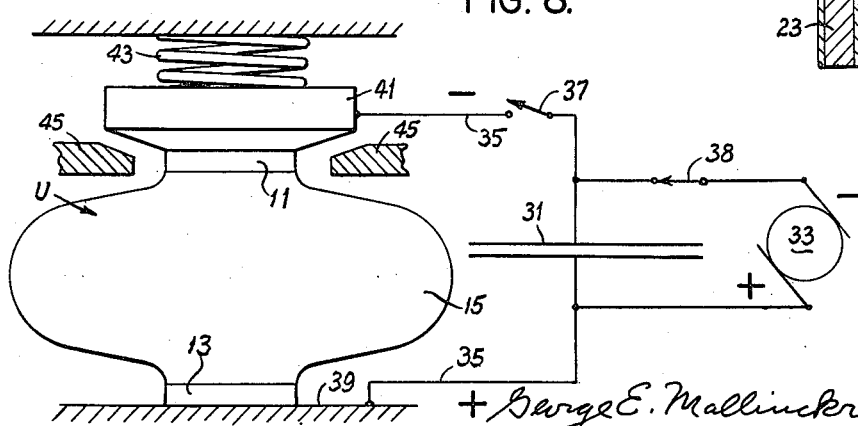
FIG. 8.
George E. Mallinckrodt,
Inventor.
Koenig and Pope
Attorneys.

Oct. 15, 1963  G. E. MALLINCKRODT  3,107,211
NUCLEAR APPARATUS
Filed Jan. 25, 1960  3 Sheets-Sheet 2

Oct. 15, 1963    G. E. MALLINCKRODT    3,107,211
NUCLEAR APPARATUS
Filed Jan. 25, 1960    3 Sheets-Sheet 3

George E. Mallinckrodt,
Inventor,
Koenig and Pope,
Attorneys.

3,107,211
Patented Oct. 15, 1963

3,107,211
NUCLEAR APPARATUS
George E. Mallinckrodt, 20 Kingsbury Place,
St. Louis 12, Mo.
Filed Jan. 25, 1960, Ser. No. 4,553
4 Claims. (Cl. 204—193.2)

This invention relates to nuclear apparatus, and with regard to certain more specific features, to apparatus for inducing nuclear reactions. Among other things, the invention is an improvement upon nuclear apparatus such as disclosed in my copending United States Patent application Serial No. 823,250, filed June 26, 1959.

Among the several objects of the invention may be noted the provision of apparatus for inducing nuclear reactions wherein a constrictive effect of a magnetic field is employed for improved operation; the provision in nuclear apparatus of an efficient form of electrical circuit for producing said field wherein, for a given number of ampere turns, less impedance is presented to current flow, with resulting reduction in rise and decay time of any current pulses therein; the provision of an electrical circuit of the class described, adapted in a small space with less expenditure of input energy and by increased stabilization, to facilitate nuclear reactions of the type referred to in said application. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated.

FIG. 1 is a cross section, partly in elevation, showing one form of the invention;

FIG. 2 is an enlarged cross section of the conductors employed to form the coils in FIG. 1;

FIG. 5 is an axial section of a form of nuclear fuel element employed in the arrangements of FIGS. 1, 3 and 6;

Corresponding reference characters indicate corresponding parts throughout the several views of the drawings.

Figure 4:
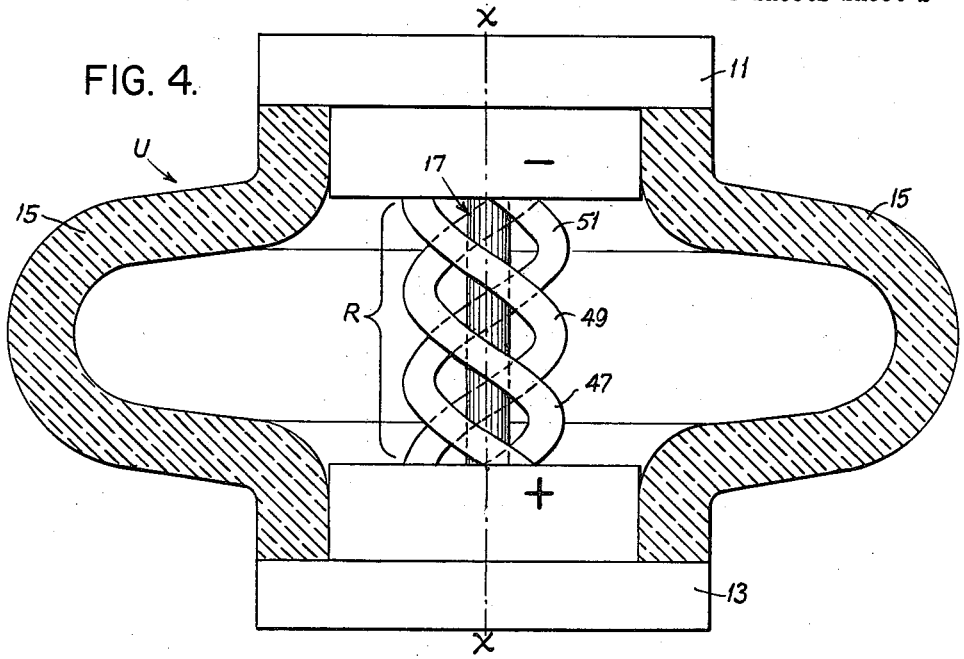
FIG. 4 is a view similar to FIG. 1, showing another form of the invention.
Figure 3:
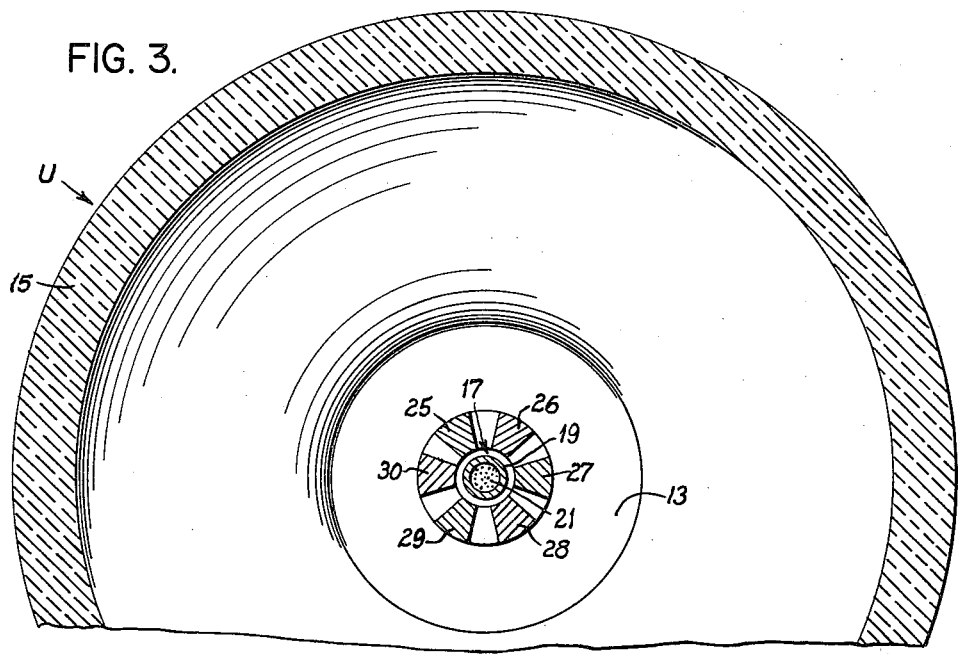
FIG. 3 is a cross section taken on line 3—3 of FIG. 1.

Referring now to the drawings, and more particularly to FIG. 1, numerals 11 and 13 indicate heavy conductive terminals forming sealed conductive enclosures for an insulating evacuated bulb 15 composed, for example, of glass or quartz. The terminals 11, 13 may be composed, for example, of copper, silver or the like, adapted to present a very low resistance to a large flow of current. Connected between the terminals 11 and 13 is a nuclear fuel element 17, shown in cross-sectional detail in FIG. 5. This may be composed of a cylindrical tube or shell 19, made of a heavy element such as copper, silver, or gold or a light-weight element such as beryllium, magnesium or the like. Intermediate weight elements such as aluminum or titanium are not desirable because they tend to form undesirable Bremstrahlung rays and substances which have a cooling effect in the high-temperature reactions sought. The shell 19 is filled with a short length of a nuclearly reactive fuel material 21, composed, for example, of lithium hydride (consisting of lithium deuteride with 1–10% by weight inclusive of lithium triteride). This form of fuel is solid. Or the fuel 21 may be composed of a half and half mixture by weight of these substances in crystalline or pressed powder form. Another form of fuel element 21 might be a half and half mixture by volume of tritium and deuterium gases, under a pressure ranging from 100–100,000 p.s.i. The shell 19 in all cases is closed at its ends by plugs of material such as tungsten 23 or a cylindrically crimped end of the tube 19. The outside diameter of the tube 19 may be about $\frac{1}{16}$ inch and its inside diameter about $\frac{1}{32}$ inch. This makes a wall thickness of about $\frac{1}{64}$ inch. The length of the fuel element 21 may be on the order of ½ inch, which is approximately the same as the distance between the inner surfaces of the terminals 11 and 13. The element 17 is conductively connected to the terminals 11 and 13 as by bonding, staking or the like in sockets 12 and 14. It is important that all of the cylindric surfaces of the parts 19, 21, 23 shall be substantially concentric.

Parallel-connected between the terminals 11 and 13 are a number of helical ribbons 25, 26, 27, 28, 29 and 30, composed of high-mass material such as gold or silver. Six of these ribbons are used in this example, peripherally spaced at equal intervals of 60° and forming a close bundle of axially equally spaced conductors around the fuel element 17. The coils are skewed left-handed. The distance between them is approximately equal to their mean thicknesses. Their inner margins are close to but not touching element 17. Each ribbon is preferably of the general cross-section shape of FIG. 2, i.e., narrower on the inside edge than on the outside edge. Dimensions may be, for example, $\frac{1}{16}$ inch wide, the thickness at the outside edge 9 on the order of $\frac{1}{32}$ inch and the thickness at the inside edge 7 being $\frac{1}{64}$ inch.

In FIG. 8 is shown how a complete unit U, as shown in FIG. 1 and described above, may be used to obtain a nuclear reaction. In this figure, numeral 31 indicates a condenser of a capacity from $10^{-2}$ to $10^{-5}$ farads, for example. At numeral 33 is shown a generator adapted to charge the condenser 31 to a voltage in the range of 50–500 kv. Switch 38 allows the generator to be cut out of circuit when the condenser is discharged. The condenser 31 is connected through heavy conductors 35 and a switch 37 with conductive tungsten blocks 39 and 41. Block 41 may be normally biased toward block 39 by resilient means such as a spring 43. In the absence of one of the units such as shown in FIG. 1, the block 41 will rest upon stops 45. Thus the unit U may be inserted between the blocks 39 and 41, thereby placing it in the circuit 35. After the condenser 31 has been charged, the switch 37 may be closed. The result will be an extremely heavy, rapidly rising rush of current flowing in parallel through the fuel element 17 and the coiled conductors 25–30.

That part of the current discharged through the several parallel branches of the circuit constituted by the helical coils 25—30 flows from negative to positive along left-handed helices, ultimately vaporizing them. That part flowing through the fuel element 17 ultimately vaporizes it also. In the process, however, a strong rapidly rising magnetic field is generated by the coils. Part of this field is of substantially cylindric form within the coils and part is of substantially cylindric form outside the coils. The part outside is constrictive. The part inside is inwardly implosive into the fuel element 17, converging a shock wave on the center line X—X. In the process, eddy currents are induced in the wall formed by tube 19 of element 17, with heating in addition to heating due to axial current flow in this tube 19. In the process, a plasma is formed containing the fuel 21. The tube 19 is destroyed in the process of plasma formation. Any electrons which boil off from the inner surface of the tube 19 will tend to separate the plasma from the inner walls of the tube 19. This further compresses the plasma centrally. It may be noted that the electrons produced from tube 19 as the process goes on will constitute a material which is a much better and highly conductive material than the tube itself was when solid.

The helical currents through the helices affect a transformer action in which the parallel-connected helices act as a primary transformer winding with low impedance, rapidly to produce the stated eddy currents in the metal materials of the tube 19. These currents in turn act as the primary of a transformer to produce further currents within the plasma itself. This confines and compresses the plasma.

Any polarization of the fuel atoms will subject them to a magnetic moment tending to align them north and south along axis X—X. This increases the exposure of their internal nuclear structures, and makes them more vulnerable to collisions with oppositely inwardly directed jets of positive ions that are generated in the process. The result in the initially formed, high-temperature plasma will be a nuclear reaction. It should be noted that the ampere turns provided by the parallel-connected helices 25–30 are obtained with lower impedance than if an equal number of them were connected in series around axis X—X.

It will be understood that in the process the entire unit U is destroyed, the heat formed being disposed of in any appropriate manner. In order to obtain another reaction, another unit is inserted between the blocks 39 and 41, after opening the switch 37. Repetition of the process of inserting units U between electrodes 11 and 13 may be carried on by suitable manual or automatic means.

In FIG. 4 is shown another form of the invention like that shown in FIG. 1 except that the forms and numbers of the parallel-connected bundled helical conductors are different. Like numerals designate like parts. In this case, triple left-handed helices lettered 47, 39 and 51 are used, each composed of a wire of gold, silver or the like, on the order of .040 inch in diameter. These are symmetrically spaced at 120° intervals, with somewhat more spacing between coils and between them and the fuel element 17. Details of the fuel element are again as shown in FIG. 5. The operation of this form of the invention is generally the same as that described in connection with FIG. 1.

Figure 6:
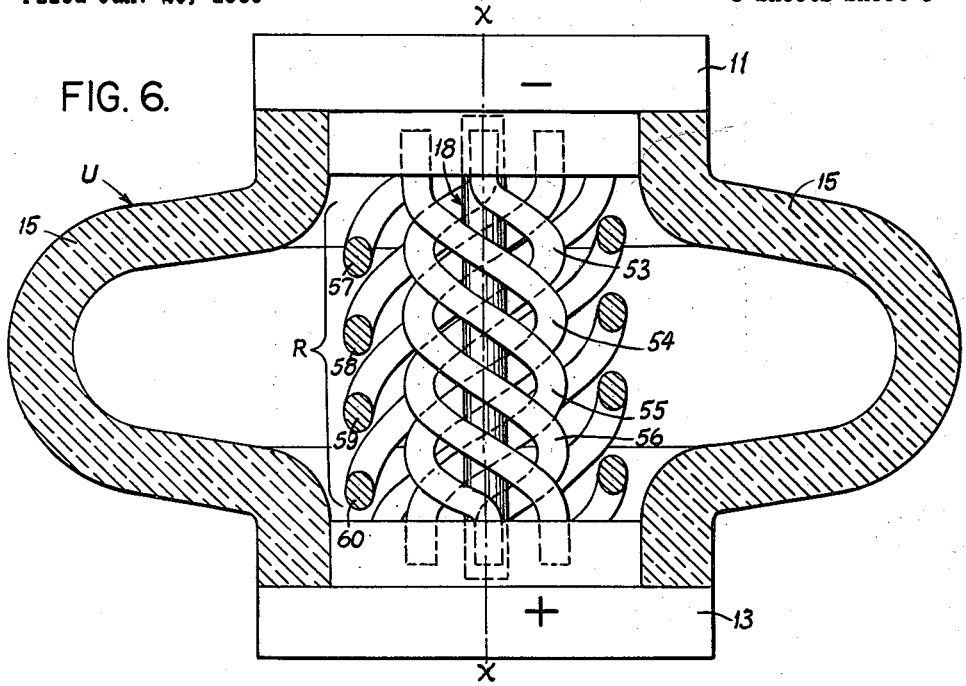
FIGS. 6 and 7 are views similar to FIGS. 1 and 3, illustrating additional forms of the invention; and, FIG. 8 is a view illustrating a circuit wherein the apparatus such as shown in FIGS. 1—7 may be reacted.

Another form of the invention is shown in FIG. 6. This shows an inner bundle of four equally spaced, left-handed coils 53–56, looped around a fuel element 18. Spacing between them and around the fuel element 18 is on the order of the wire diameter. Around this inner bundle is an outer bundle of four equally spaced, left-handed coils 57–60. The eight coils 53–60 are in electrical parallel connection between terminals 11 and 13. The diameters of the wires are on the order above described. The fuel element is like that of FIG. 5, although somewhat longer. Again the operation is similar to that above described, except that the electromagnetic effects of outer bundle 57–60 are additive to those of the inner bundle 53–56.

Figure 7:
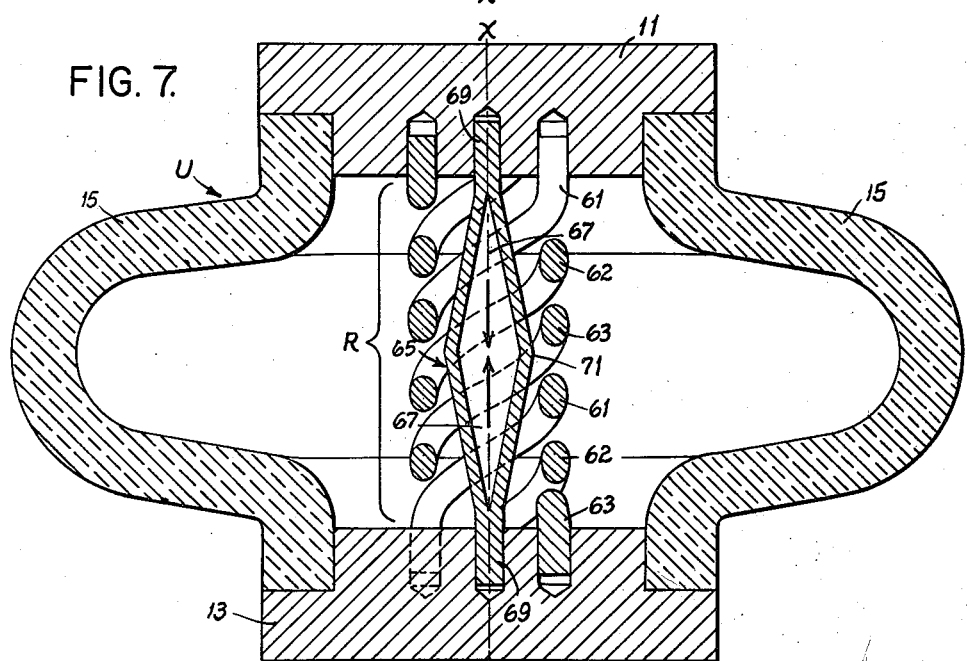

In FIG. 7 is shown another form of the invention in which again a triple symmetrical set of helical gold, silver or like coils 61, 62 and 63 is employed between the terminals 11 and 13, sized, spaced and operating like those above described but surrounding a different form of fuel element 65. In this case the copper or other conductive fuel element is formed with a longitudinal section which is generally diamond-shaped, as determined by two conical portions 67 joined at their large ends. Their small ends are formed with terminals 69 conductively connected with the terminals 11 and 13, respectively. The outside diameter of this fuel element at its waist portion 71 may be about ⅛ inch, and its wall thickness about 1/64 inch. The fuel element may contain any one of the nuclear fuels above mentioned. The advantage of the double-cone shaped fuel element is that when the reaction takes place as above described, and applicable to the present form of the invention, a so-called "shaped-charge" phenomenon will occur. That is, two jets of ions, as indicated by the arrows in FIG. 7, will collide with one another to aid further in the release of energy. Otherwise the operation of this form of the invention is similar to the operations already described.

It is to be understood that while particular numbers of coils are indicated in FIGS. 1–7, other symmetrically disposed numbers greater than two may be employed. A number greater than two is desirable in these structures in order to assure stability of the implosive effects toward the center line X—X.

In view of the above, it will be seen that one aspect of the invention relates to a plurality of parallel-connected helical conductors surrounding coincident, or approximately coincident, axes, have the effect of minimizing resistance and inductance, and therefore impedance in the circuit.

Another phase of the invention concerns the symmetrical arrangement of the parallel-connected helical conductors. This feature is particularly useful in those cases in which three or more coils are employed to obtain an inwardly directed constraining force or pinch effect in the space encompassed by the coils. It also aids the symmetry of opposite inward movements of jets of positive ions from the inner surfaces of the walls of tube 19 of the fuel elements for cross collisions near the axis in the contained fuel (such as 21).

Another feature of the invention is the construction of the helical conductors of heavy-mass material such as gold or silver, so that substantial inertia is introduced, thereby aiding reaction to the imploding forces.

In addition, the shaped-charge configuration of the fuel element such as shown in FIG. 7 is important because it contributes axially opposed flows of positive ions for axial collisions to enhance the favoring energy release. These collisions are in addition to collisions which occur along the axis of the fuel element between oppositely directed jets of ions moving inward from the walls of the fuel element.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Nuclear apparatus comprising a plurality of electrical conductors forming a like plurality of helices looped around a substantially common straight-line axis, said helices being symmetrically positioned with respect to one another both axially and peripherally with respect to said axis, a fuel assembly extending along said axis within said helices, said fuel assembly including a core selected from the group consisting of isotopes of hydrogen and lithium hydride enclosed within a conductive jacket, a pair of conductive terminals connecting said electrical conductors in parallel with each other and with said conductive jacket, a bulb enclosing said conductors and fuel assembly adapted to exclude air therefrom, a condenser of substantial capacity, a high-voltage generator, means for connecting said generator across said condenser to charge said condenser to a high voltage, and means for connecting said condenser across said conductive terminals, said electrical conductors and said conductive jacket forming a current path between said terminals whereby said condenser is discharged through said electrical conductors and said conductive jacket, the current therethrough being sufficient to vaporize both said jacket and said electrical conductors whereby the temperature of said core is raised sufficiently to induce a nuclear reaction therein.

2. Nuclear apparatus as set forth in claim 1 wherein said conductive jacket is tubular and has a comparatively large mid-portion and converging end portions.

3. Nuclear apparatus comprising a plurality of electrical conductors forming a like plurality of helices looped around a substantially common straight-line axis, said helices being symmetrically positioned with respect to one another both axially and peripherally with respect to said axis, a fuel assembly extending along said axis within said helices, said fuel assembly including a core comprising isotopes of hydrogen enclosed within a conductive jacket, a pair of conductive terminals connecting said electrical conductors in parallel with each other and said conductive jacket, an evacuated bulb for enclosing said conductors and fuel assembly, a condenser of substantial capacity, means for charging said condenser to a high voltage, and means for connecting said condenser across said terminals whereby said conductors and said fuel assembly form a current path through which said condenser is discharged, the current through said fuel assembly being sufficient to vaporize the conductive jacket thereof and implode a shock wave upon said core thereby raising the temperature of said core to form a plasma, the current through said electrical conductors being sufficient to vaporize them and produce a rapidly rising magnetic field to confine and compress said plasma, whereby the temperature of said plasma is raised sufficiently to induce a nuclear reaction therein.

4. Nuclear apparatus comprising a plurality of electrical conductors forming a like plurality of helices looped around a substantially common straight-line axis, said helices being symmetrically positioned with respect to one another both axially and peripherally with respect to said axis, a fuel assembly extending along said axis within said helices, said fuel assembly including a core comprising lithium hydride enclosed within a conductive jacket, a pair of conductive terminals connecting said electrical conductors in parallel with each other and said conductive jacket, an evacuated bulb for enclosing said conductors and fuel assembly, a condenser of substantial capacity, means for charging said condenser to a high voltage, and means for connecting said condenser across said terminals whereby said conductors and said fuel assembly form a current path through which said condenser is discharged, the current through said fuel assembly being sufficient to vaporize the conductive jacket thereof and implode a shock wave upon said core thereby raising the temperature of said core to form a plasma, the current through said electrical conductors being sufficient to vaporize them and produce a rapidly rising magnetic field to confine and compress said plasma, whereby the temperature of said plasma is raised sufficiently to induce a nuclear reaction therein.

References Cited in the file of this patent

UNITED STATES PATENTS

| | | |
|---|---|---|
| 873,253 | MacGahan | Dec. 10, 1907 |
| 1,213,639 | Price | Jan. 23, 1917 |
| 1,753,408 | Gebhard | Apr. 8, 1930 |
| 1,972,319 | Rypinski | Sept. 4, 1934 |
| 2,747,068 | Lackner | May 22, 1956 |
| 2,838,641 | McArthur | June 10, 1958 |
| 2,847,651 | Schamanek | Aug. 12, 1958 |
| 2,939,049 | Blackman | May 31, 1960 |
| 2,991,238 | Phillips et al. | July 4, 1961 |
| 2,993,851 | Thompson et al. | July 25, 1961 |

OTHER REFERENCES

Project Sherwood, by Aniasa S. Bishop, Sept. 1958, pp. 1–14, 181, 182.